Dec. 30, 1969 P. NILSSON 3,486,541

LOG CHIPPING APPARATUS

Original Filed June 26, 1964 7 Sheets-Sheet 1

Dec. 30, 1969 P. NILSSON 3,486,541

LOG CHIPPING APPARATUS

Original Filed June 26, 1964 7 Sheets-Sheet 3

Dec. 30, 1969 P. NILSSON 3,486,541

LOG CHIPPING APPARATUS

Original Filed June 26, 1964 7 Sheets-Sheet 4

LOG CHIPPING APPARATUS

Original Filed June 26, 1964 7 Sheets-Sheet 5

Dec. 30, 1969 P. NILSSON 3,486,541

LOG CHIPPING APPARATUS

Original Filed June 26, 1964 7 Sheets-Sheet 6

LOG CHIPPING APPARATUS

Original Filed June 26, 1964

United States Patent Office 3,486,541
Patented Dec. 30, 1969

3,486,541

LOG CHIPPING APPARATUS

Philip Nilsson, Soderhamn, Sweden, assignor to Soderhamns Verkstader Aktiebolag, Soderhamn, Sweden Continuation of application Ser. No. 378,181, June 26, 1964. This application Mar. 17, 1967, Ser. No. 624,018
Claims priority, application Sweden, June 28, 1963, 7,199/63
Int. Cl. B27l 11/02
U.S. Cl. 144—176 10 Claims

ABSTRACT OF THE DISCLOSURE

A machine for the economical utilization of waste material by sawing of wood and the like in which the waste material otherwise obtained is directly cut into chips for pulping by at least one cutting member for cutting chips by the so-called parallel cutting method.

This application is a continuation of Ser. No. 378,181, filed June 26, 1964, and now abandoned.

This invention relates to a machine for the economical utilization of waste material by sawing of wood, and the machine is characterized essentially in that said waste material is directly cut into chips for pulping by the so called parallel cutting method.

Accordingly, a machine for carrying this method into effect is essentially characterized by at least one cutting member for chipping by the so called parallel cutting method, and which member is adapted to cut up into chips for pulping at least portions of the logs or other work pieces that are passed along said cutting member.

Figure 6:
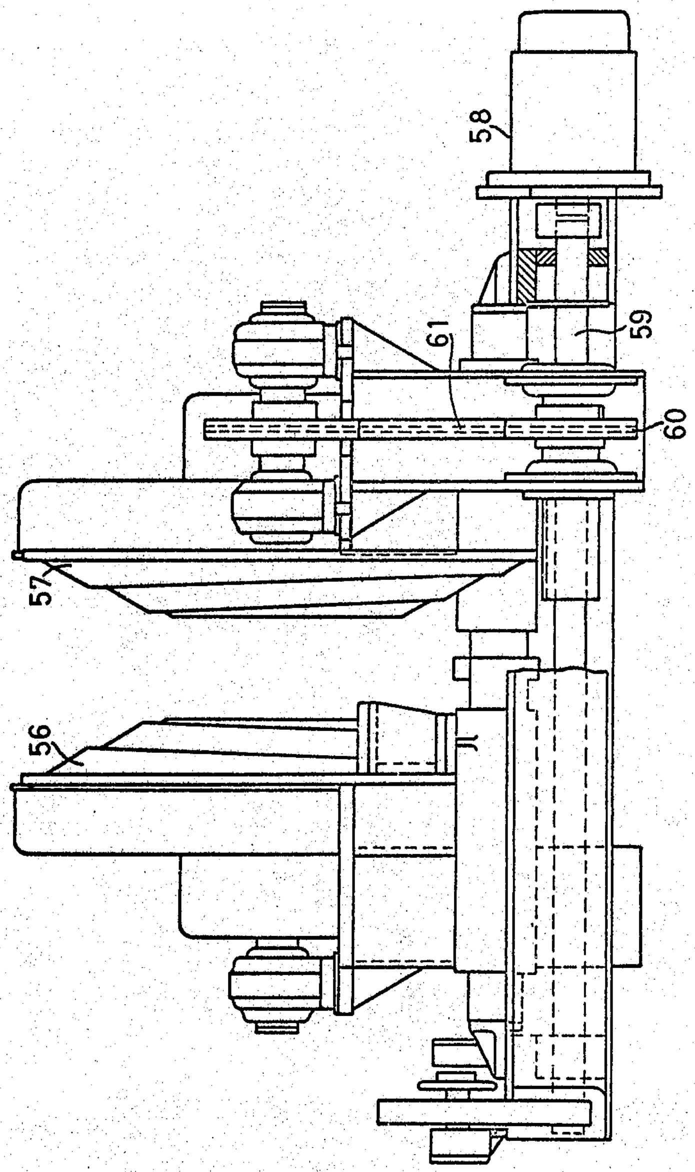
Figure 7:
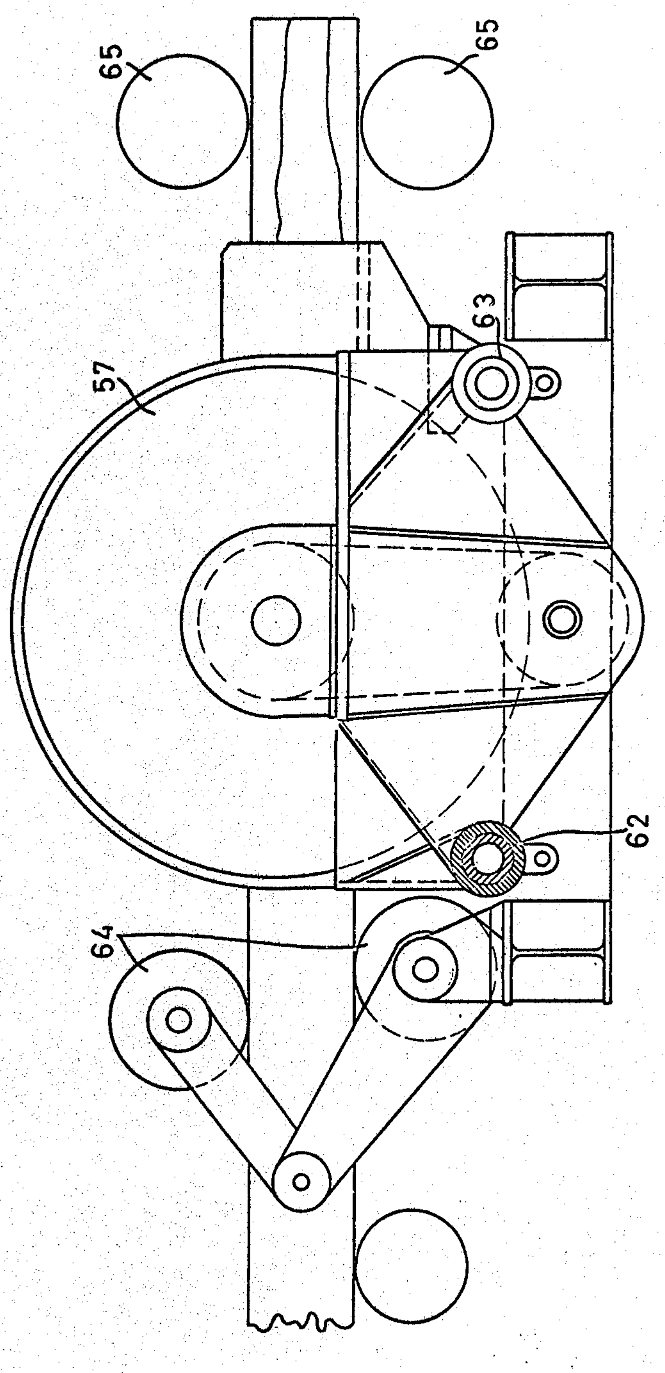
Figure 8:
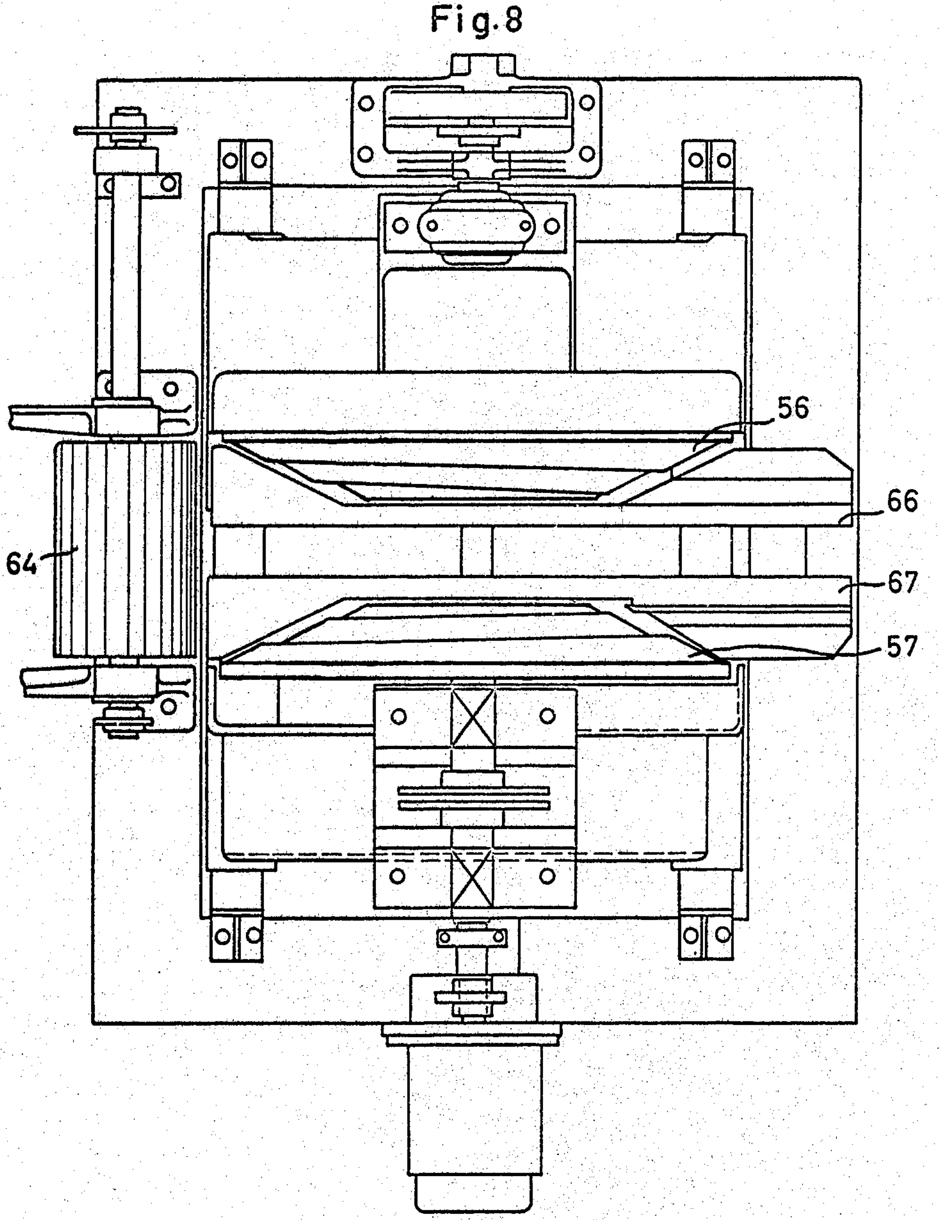
Figure 10B:
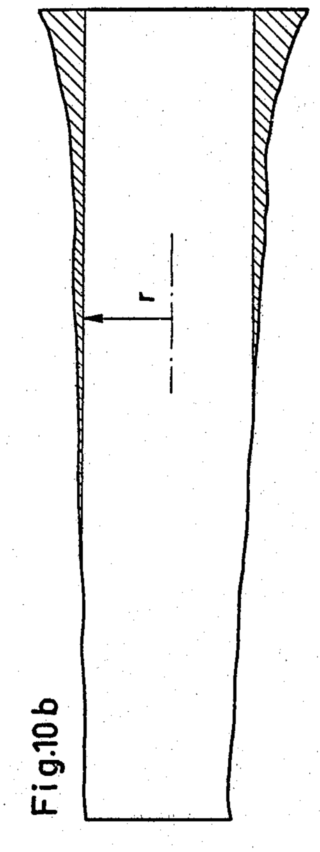
Figure 10A:
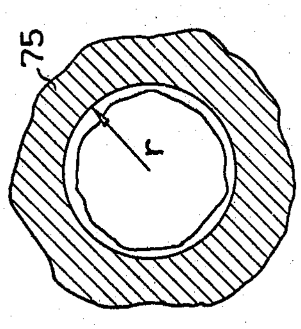
Figure 9:
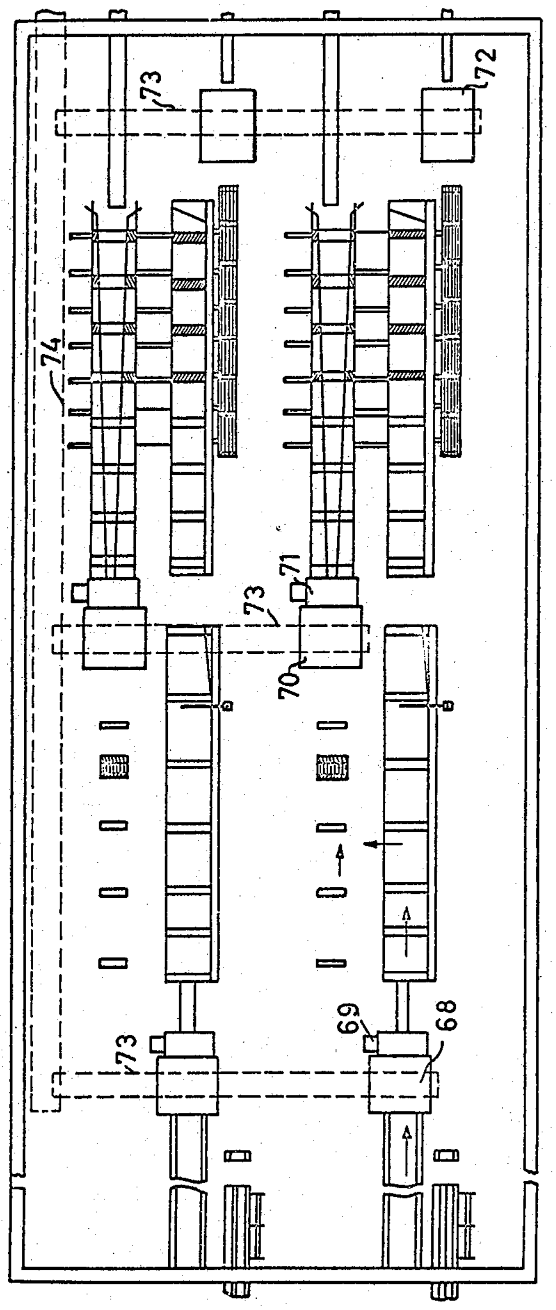

The invention will be disclosed in more details below with reference had to the accompanying drawings, in which:

FIGS. 1–5*g* schematically show how the sawing of boards and battens is accomplished;

FIGS. 6–8 respectively show end, side and plane views of the chip cutting apparatus;

FIG. 9 shows a plan view of a frame saw mill for carrying out the invention; and FIGS. 10*a* and 10*b* diagrammatically show a log passed through a rotary conical drum.

By sawing logs to obtain sawn material with a rectangular or square cross-section, such as boards and battens, there is always obtained, due to the circular cross sections of the logs remaining, portions or waste material which cannot be used as sawn material. Further, due to the shape in which the trees grow, the logs are more or less conical. In particular, it should be noted, that the logs which are taken from the lowermost portions of the trees have at their lowermost end an even more increased cross sectional area due to the widening of the trees at the root (root lyre). Such a log is shown schematically in FIG. 1. Due to this fact the cross sectional area of these portions of the log which are not used as sawn material will increase towards the root end of the log.

Figure 1:
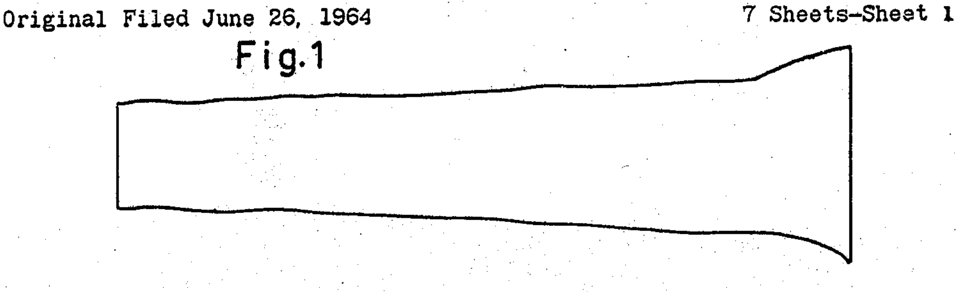
Figures 2, 3A, 3B:
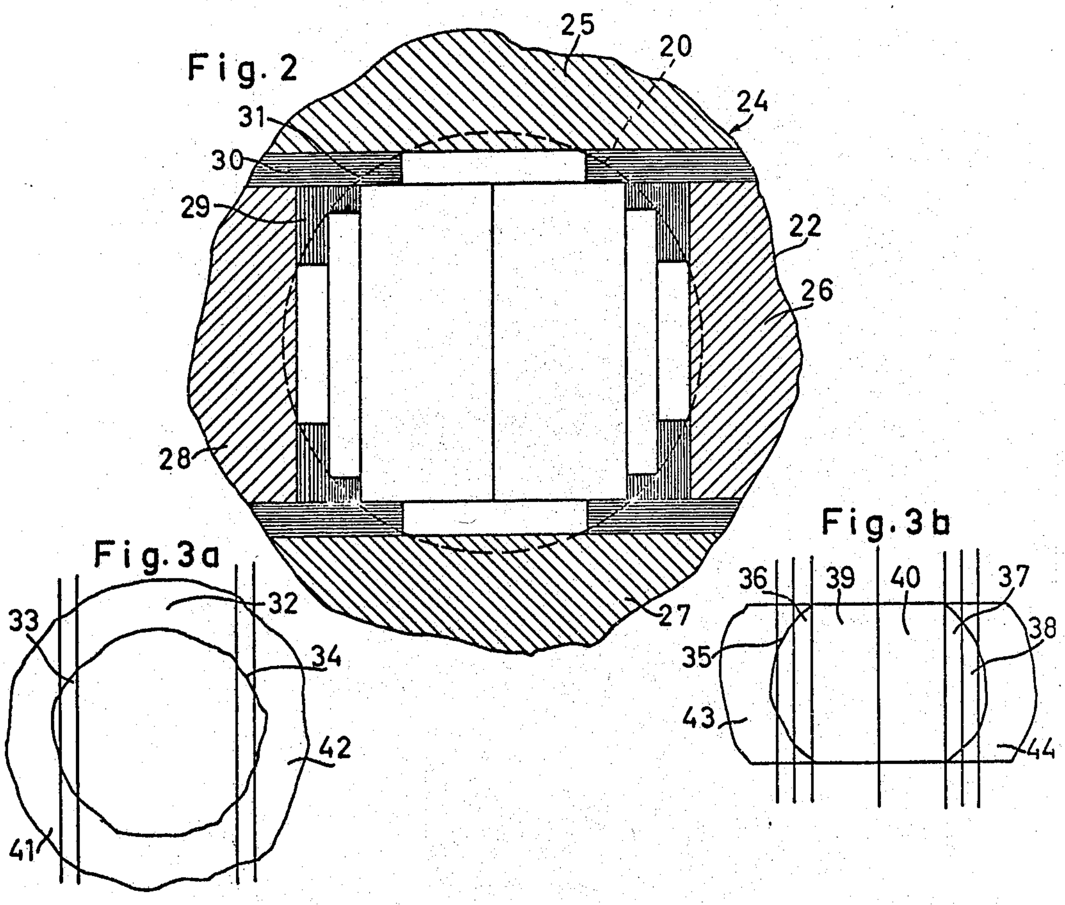
Figure 3C:
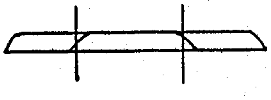
Figure 3D:
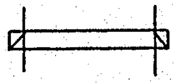
Figure 3E:
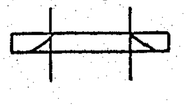
Figure 4A:
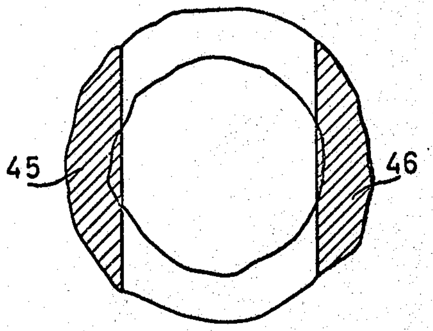
Figure 4B:
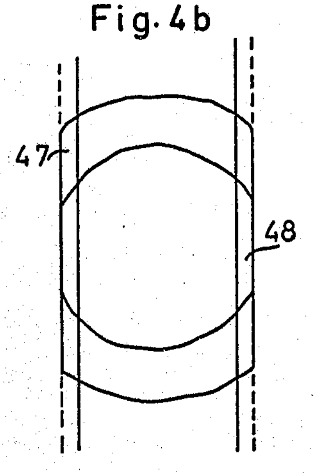
Figure 4C:
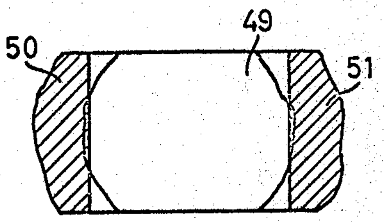
Figure 4D:
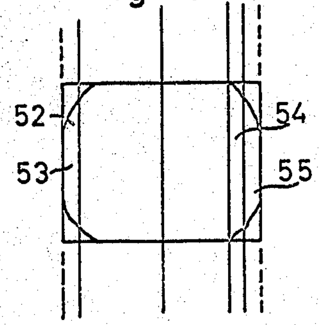
Figure 4E:
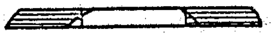
Figure 4F:
Figure 4G:
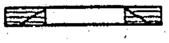
Figure 5A:
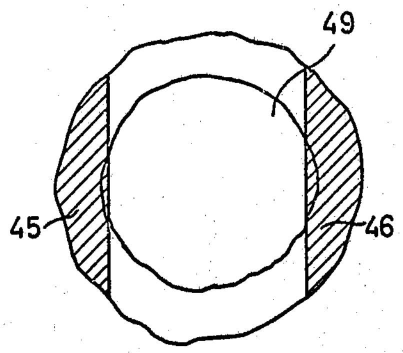
Figure 5B:
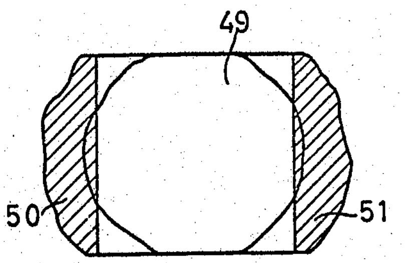
Figure 5C:
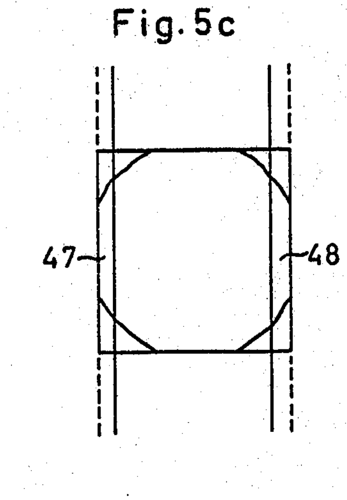
Figure 5D:
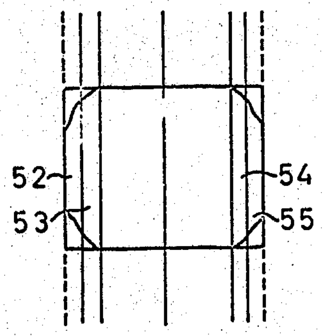
Figure 5E:
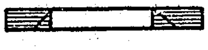
Figure 5F:
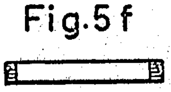
Figure 5G:
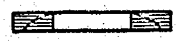

In FIG. 2, where the innermost circle 20 limits the top surface and the outermost circle 22 limits the root surface, there is shown one example of how a log 24 is normally sawn up into sawn material, shown unsectioned in FIG. 2. The hatched portions 25, 26, 27, 28 of the log are normally called slabs and are severed by means of a frame-, circle- or band-saw. The portions 29, 30, 31 shaded with vertical and horizontal lines are severed from the boards in a canting machine and are called edgings.

FIGS. 3*a*–3*e* show the operations by frame sawing. In a first frame saw, an edge frame saw, there is sawn a block 32 and side boards 33, 34, as is shown in FIG. 3*a*. The side boards 33, 34 are passed on to a canting machine, whereas the block 32 is passed on to a second frame saw, a parting frame, where the block according to FIG. 3*b* is sawn up into side boards 35, 36, 37, 38 and a sharp edged central portion, i.e., parallel-sided battens or boards, as is shown by the thick battens 39, 40. The slabs 41, 42, 43, 44, which are obtained in the edge frame saw and the parting frame, are separated from the side boards and may sometimes be sold as they are or sawn into wood for burning etc. The side boards 33, 34, 35, 36, 37, 38, the edges of which are inclined and non-parallel after the frame sawing, viz due to the log shape, are then sawn in the canting machine by means of two parallel blades, so that sharp edged, parallel-sided boards are obtained, as is shown in FIGS. 3*a*–3*e*. The edgings which are obtained in the canting machine are separated off in a special edgings separator after the canting machine and have to be conveyed off, essentially as a pure waste material.

The existence of the above mentioned waste portions on the log, i.e. the shaded portions in FIG. 2, causes numerous troubles in the sawing mills:

The conical shape of the logs and their root lyres that the sawing machines have to be over dimensioned in order to permit the passage of the very few logs which have the greatest root lyres. This drawback is particularly noticeable with frame saws, where the speed and thus the capacity is determined by the weight of the moving portions. A log with a great root lyre calls for a wide and thus heavy loose frame, which necessitates a low speed.

Furthermore, the maximum speed of feed through the saw machine is inversely proportional to the dimension which is to be cut through. Thus, also due to this circumstance the waste portions of the log result in a reduction of the production by the saw mills.

By frame sawing further losses sometimes arise in that portions of the root lyres often jam up between the saw blades and cause stops in production.

For separating the boards from the slabs in the frame saw mills there is commonly arranged between the frame saw and the following conveyor for transport of the boards and opening in the floor, a so called slab steep. The intention is that the slabs due to the widening by the root end shall be drawn down this slab steep by gravity, down to a conveyor in a lower flat. As it is not desired to take the risk that the boards fall down the slap steep, the distance between the frame saw and the board conveyor may not be too long, and due to this in practise only some of the slabs will fall down the slab steep by themselves. With respect to this, one has either to place one extra man to throw the slabs manually down the slab steep or to permit the slabs to follow the side boards to the edging machine and let the personnel at this machine separate the boards from the slabs. Normally, one tries to avoid the last mentioned alternative, first because the canting machine is strongly occupied and secondly because the slabs with their irregular shape complicate the transport of the side boards on their conveyor.

After the canting machine there is required an edgings separator, from which the edgings fall down into the lower flat. This separator has to be of the same length as that of the longest board.

If the slabs steep is to operate satisfactorily a rather great fall height is required, and furthermore, the conveyors for transport of slabs and edgings to a suitable place of deposit take a rather great space. This results in that the volume of the building for the lower flat becomes rather great.

To remedy the above mentioned drawbacks attempts have been made to make chips or splints of the waste portions by means of cutters or various types of saw blades, either before the saw machines or adjacent the machines. However, the splints or saw dust obtained with these methods has a very low value, and generally it may be said the costs for getting rid of the dust nearly balance out the value of the dust as raw material for e.g. particle board production or the value thereof such as for burning purposes.

The present invention remedies the above mentioned drawbacks in that the waste portions of the logs before the saw machines, or within the same, are converted to valuable chips for pulping. In this connection it should be noted that the price of chips for pulping as now disclosed is about 10 to 12 times as high as the price of sawdust.

The conversion of the waste portions of the log into valuable chips for pulping as suggested by the present invention may be carried into effect in two principally slightly different ways. In the first way one or more of the sides of the log or batten are planed off while the work piece is fed longitudinally of itself.

FIGS. 4 and 5 illustrates how this method is applied in connection with frame sawing. Before the canting frame the sides of the log are planed off to such an extent that all the wood outside imaginary cuts of the outermost blades of the canting frame, is cut up into chips for pulping by so called parallel cutting. These portions have been designated 45 and 46 in FIG. *4a*. Then, the log is fed onto the canting frame, FIG. *4b*, wherein two side boards 47 and 48 are severed off. After a 90° turn the block 49 is planed off once more by parallel cutting so that all of the wood outside the cuts which is to be sawn by the outmost blades of the parting saw frame is converted into chips for pulping, as is shown in FIG. *4c* by the portions 50 and 51. Then the block 49 is sawn in the ordinary manner in the parting saw frame, as is shown schematically in FIG. *4d*, so that side boards 52, 53, 54 and 55 are obtained. The planing off of the log or block should take place immediately before the frame saws so that one and the same centering may be utilized both for planing and for sawing. Probably it may be possible to omit the outermost blades in the frame saw entirely, which blades are shown by the dotted lines in FIGS. *4b* and *4d*. This question is dependent of the measure tolerances for the outermost boards as well of existing requirements with respect to the surface finish of the boards.

In accordance with the just mentioned procedure it would naturally also be possible to substitute the saw blades in the canting machine by tools for cutting these portions of the board into chips for pulping which are disposed outside the width thereof after canting, i.e. the portions which are shaded by horizontal lines in FIGS. *4e–4g*.

As an alternative to the just described embodiment it would also be possible to plane off all the four sides of the log entirely before the sawing. Such a method has been shown schematically in FIGS. *5a–5g*. The plane surface obtained in this case may naturally be used as guide surfaces by the centering of the work piece in the frame saws.

For carrying the just mentioned method into effect the machine as shown in FIGS. 6, 7 and 8 is preferably used. Here, FIG. 6 shows the machine in end view, FIG. 7 shows the machine in side view and FIG. 8 shows the machine in plan view.

The machine shown as an example has two oppositely disposed, conical discs, which are provided with cutting knives of the principal design as set forth in Swedish Patent No. 223,643, granted on Feb. 15, 1968 (Swedish patent application 7,666/62, filed July 9, 1962). These knives are so designed that they, by cutting, remove strip shaped portions while engaging with the side surface of the logs, which removing or loosening is carried out by means of an edge line which runs essentially parallel to the fibre direction of the wood. Thus, in the strips the fibre direction runs essentially crosswise over the width of the strips. To the just mentioned main edge line of each knife there adjoins another edge line at an angle to said main edge line so that said other edge line cuts the fibre direction. In connection with the loosening of the said strips these will be broken in the length direction so that individual chip pieces are obtained. So as has been disclosed in the above mentioned patent the working surface of the log or work piece will have the shape of a stepped end surface.

As has been disclosed in Swedish patent application No. 7,198/63, filed June 28, 1963 and still pending (priority is claimed from this application which dates to a "Chipping Machine"), and as is also shown in FIG. 6, the discs 56, 57 are in the present case provided with spiral shaped grooves, along which the cutting knives are disposed. In this case each disc 56, 57 may be provided with spiral shaped grooves with several entering ends, which as has been set forth in the just mentioned patent, results in that the discs may have comparatively small dimensions and still work in a rather great wood cross section.

In FIGS. 6–8 the discs are shown as being arranged at a rather small distance from each other with the rotational axis disposed horizontally. In this embodiment the discs are driven by means of a common hydraulic motor 58 or the like, which motor is driving a shaft 59 below the machine. This shaft in turn is driving the disc 56 through a transmission (not shown), and the shaft carries a pulley 60 which is displaceable longitudinally of said shaft and is driving a transmission 61 for driving the conical cutting disc 57. As is shown particularly in FIG. 7 the cutting disc 57 with bearing and driving members is carried adjustably to be positioned on a greater or lesser distance from the cutting disc 56. In FIG. 7 it is shown that the logs are fed in longitudinally by means of suitable feed rolls 64, in which case the feed direction is perpendicular to a plane through the rotational axis of the discs 56, 57. After planing by parallel cutting the work pieces are received directly by feed rolls 65 in a following frame saw. During the passage through the chipping machine the work pieces rest on supports 66, 67 which at the same time act as anvils for the cutting operation.

It should be noted here that the common drive motor 58 may naturally be substituted by separate motors, such as hydraulic motors for each one of the discs 56, 57. However, it should be noted that it is important to maintain the rotational speed of the discs 56, 57 at a suitable value, adjusted with respect to the rate of feed of the logs, and that it is also essential that the rotational speed of both discs are as close to each other as possible.

The chips produced by this method fall down, for instance, onto a band conveyor, or are sucked up and conveyed off by means of pneumatic conveyor means. One example of the utilization of the above disclosed method in a frame saw mill is shown in FIG. 9 where the sawing is carried out in two parallel lines. In FIG. 9 there is shown for each line one dimensioning cutter 68, for instance of the type as shown in FIGS. 6–8, one canting saw frame 69, a second dimensioning cutter 70, a parting frame 71 and finally a canting chipping machine 72. For the chipping machines of the two lines there are further shown three cross conveyors 73 and one longitudinal conveyor 74 on which the produced chips are received and conveyed to a suitable chip magazine.

The advantages obtained by the invention may be summarized as follows:

The sawing machines may be dimensioned with considerably small through-going dimensions than hitherto. The frame saw has increased capacity in as much as the speed may be increased considerably due to the use of narrower loose frames than hitherto. By the present invention production stops are decreased which also increased production capacity. Furthermore, manpower is saved as all manual handling of edgings and slabs is avoided. Also, the conveyor means in the saw mill are simplified as e.g. the need for an edgings separator after the edging machine is eliminated. Finally, and very importantly, the volume of the building of the saw mill may be considerably reduced.

Another embodiment according to the present invention contemplates a limitation of the circular cross-section of the log by passing the log through a rotary conical drum, which is internally provided with cutting knifes of the above mentioned kind. In this case the centre line of the log should coincide with the rotational axis of the drum. This proposal is diagrammatically shown in FIG. 10*a* and FIG. 10b. It will be easily realized that those portions 75 of the log which are disposed at greater distance from the centre line than the radius *r* for the smallest let through opening of the drum will be engaged by the internal conical surface of the drum and will be cut up into chips by the so called parallel chipping method as has been set forth in the above mentioned patent. Also with this somewhat simplified method it is obtained that the sawing machines may be dimensioned with considerably reduced let through dimensions which, at least by frame sawing, enables a considerable increase in the production. Further, because the conicity of the log has been reduced and possible root lyres have been removed, the handling of the remaining slabs is facilitated.

It should be noted that the above described methods of dimensioning work pieces of wood by parallel chipping are naturally by no means limited to be used only in connection with saw mills. Instead, it is possible to utilize the methods in any other connection; thus, cylindrical blanks of wood may advantageously be made while utilizing a conical cutting drum of the just disclosed kind.

Further, it should be noted that if the two conical discs by the first disclosed method are brought entirely together then the whole work piece as fed to the machine will be cut into chips for pulping. This may be used for instance so that if a log or board blank due to quality or geometrical shape is unsuited for sawing into boards, then the whole log or board blank may be cut up into chips for pulping and thus be utilized in an economically advantageous manner. In this connection it should be noted that any kind of control device may be used for adjusting the conical cutting discs and that said control device may be monitored in any convenient and already known way, viz, either manually or automatically while using for instance electronic control devices.

Naturally, for special applications, it is also possible to arrange the discs with the cutting knives entirely immovable in the axial direction. Then, all of the material fed to the discs will be cut up into chips for pulping. Also, it should be noted that the members provided with knives must not necessarily have the shape of conical discs, but it is instead possible to use other suitable shapes of carrying members, in which case, however, the edge lines principally have to follow or be situated on conical surfaces as has been set forth above. For certain applications it is also possible to provide a disc shaped, or in other convenient shaped knife carrier with long cutting tools, the edge lines of which run at least essentially parallel to the generatrix of such a cone surface and nearby all the way from the axis of the knife carrier to the outer periphery of such carrier.

In view of that both drum shaped and disc shaped cutting members have been disclosed in detail in Swedish Patent 223,643 and Swedish application No. 7,198/63 and the application filed, and furthermore that it is disclosed in these cases which advantages are obtained with respect to the quality of chips, it appears to be unnecessary to disclose this once more in the present case.

Finally, it should only be noted that numerous modifications and alternations with respect to details may be carried into effect within the limits of the inventive idea.

What I claim is:

1. Apparatus for cutting at least part of a log directly into chips, comprising: at least one rotatably mounted cutter member; means for continuously feeding a log longitudinally relative to said cutter member; a surface of rotation on said cutter member inclined to the direction of movement of the log; and a series of blades on said surface spaced around the axis of rotation of said cutter member and also spaced across said surface in radial directions on a series of curves about said axis of rotation, said blades comprising cutting knives having a first cutting edge positioned to extend substantially parallel to the fibre direction of the log, and a second cutting edge at an angle to said first cutting edge and extending across the fibre direction, said second cutting edge cutting the fibres of the wood chips cut by said first cutting edge.

2. Apparatus as claimed in claim 1 wherein said series of curves are in the form of at least one spiral.

3. Apparatus as claimed in claim 1 wherein said series of curves are in the form of a plurality of spirals.

4. Apparatus as claimed in claim 1 wherein the axis of rotation of the cutter member is substantially normal to the relative direction of movement of the log.

5. Apparatus as claimed in any one of claims 1, 2 or 4, wherein the cutter member is a truncated cone.

6. Apparatus as claimed in claim 1 wherein the axis of rotation of the cutter member is substantially parallel to the relative direction of movement of the log.

7. Apparatus as claimed in claim 1 wherein further means are provided to vary the rotational speed of said cutter member relative to the speed of longitudinal movement of the log relative to the cutter member.

8. Apparatus as claimed in claim 1 including two cutter members mounted in opposition for movement of the log therebetween.

9. Apparatus as claimed in claim 8 including means for moving said cutter members toward, and away from, each other.

10. Apparatus as claimed in claim 9 wherein said cutter members are movable, substantially into contact with each other, to cut the whole log into chips.

References Cited

UNITED STATES PATENTS

| | | | |
|---|---|---|---|
| 2,889,859 | 6/1959 | Johnson | 144—176 |
| 2,949,946 | 8/1960 | Johnson | 144—162 |
| 2,964,079 | 12/1960 | Johnson | 144—176 |
| 3,240,245 | 3/1966 | Johnson | 144—176 |
| 3,282,312 | 11/1966 | Standal | 144—220 |
| 3,360,024 | 12/1967 | Traben | 144—176 |

GERALD A. DOST, Primary Examiner

U.S. Cl. X.R.

144—312